United States Patent
Petty

(10) Patent No.: US 9,874,077 B2
(45) Date of Patent: Jan. 23, 2018

(54) METHOD AND COOLING SYSTEM FOR ELECTRIC SUBMERSIBLE PUMPS/MOTORS FOR USE IN GEOTHERMAL WELLS

(75) Inventor: Susan Petty, Shoreline, WA (US)

(73) Assignee: Altarock Energy Inc., Seattle, WA (US)

( * ) Notice: Subject to any disclaimer, the term of this patent is extended or adjusted under 35 U.S.C. 154(b) by 1495 days.

(21) Appl. No.: 12/433,747

(22) Filed: Apr. 30, 2009

(65) Prior Publication Data

US 2009/0272129 A1 Nov. 5, 2009

Related U.S. Application Data

(60) Provisional application No. 61/049,281, filed on Apr. 30, 2008.

(51) Int. Cl.

| | |
|---|---|
| *F25D 17/02* | (2006.01) |
| *E21B 43/12* | (2006.01) |
| *F04D 13/10* | (2006.01) |
| *E21B 36/00* | (2006.01) |
| *H02K 5/132* | (2006.01) |
| *H02K 9/20* | (2006.01) |

(52) U.S. Cl.
CPC .......... *E21B 43/128* (2013.01); *E21B 36/001* (2013.01); *E21B 43/122* (2013.01); *F04D 13/10* (2013.01); *H02K 5/132* (2013.01); *H02K 9/20* (2013.01)

(58) Field of Classification Search
CPC ...... F04D 3/10; F04D 29/146; F04D 29/5806; F04D 29/58061; F17C 2227/015
USPC ................ 62/259.2, 260; 165/45; 417/423.3, 417/423.8, 108; 310/52–58
See application file for complete search history.

(56) References Cited

U.S. PATENT DOCUMENTS

| | | | |
|---|---|---|---|
| 3,195,630 A | | 7/1965 | Fisher |
| 3,211,935 A | * | 10/1965 | Sones ................... B60K 15/077 310/227 |
| 3,390,723 A | | 7/1968 | Hower et al. |
| 3,468,258 A | * | 9/1969 | Arutunoff ..................... 166/212 |
| 3,526,097 A | * | 9/1970 | Nelson .......................... 405/185 |
| 3,574,487 A | * | 4/1971 | Mohn ........................... 417/409 |
| 3,650,337 A | * | 3/1972 | Andrews ................. E21B 4/003 175/104 |
| 3,672,795 A | * | 6/1972 | Arutunoff et al. ......... 417/423.3 |

(Continued)

FOREIGN PATENT DOCUMENTS

| | | |
|---|---|---|
| DE | 3925337 A1 | 2/1991 |
| EP | 0338154 A1 | 10/1989 |

(Continued)

OTHER PUBLICATIONS

WO2007/040033 Translation.*

(Continued)

*Primary Examiner* — Frantz Jules
*Assistant Examiner* — Brian King
(74) *Attorney, Agent, or Firm* — Thorpe North & Western, LLP

(57) ABSTRACT

Systems and methods for cooling electrical components of an electrical submersible pump in a subterranean well are disclosed. Cooling fluid is delivered from a location proximate ground surface through a conduit to a submerged electrical pump motor in a subterranean well to cool the submerged electrical pump motor.

15 Claims, 3 Drawing Sheets

(56) References Cited

U.S. PATENT DOCUMENTS

| | | | |
|---|---|---|---|
| 3,942,101 A | | 3/1976 | Saye et al. |
| 3,960,736 A | | 6/1976 | Free et al. |
| 4,055,399 A | | 10/1977 | Parrish |
| 4,126,406 A | * | 11/1978 | Traylor ................. E21B 36/003 310/64 |
| 4,223,729 A | | 9/1980 | Foster |
| 4,520,666 A | | 6/1985 | Coblentz et al. |
| 4,559,818 A | | 12/1985 | Tsang et al. |
| 4,573,537 A | | 3/1986 | Hirasuna |
| 4,577,679 A | | 3/1986 | Hibshman |
| 4,716,964 A | | 1/1988 | Erbstoesser et al. |
| 4,749,035 A | | 6/1988 | Cassity |
| 4,832,121 A | | 5/1989 | Anderson |
| 4,832,127 A | * | 5/1989 | Thomas et al. ................ 166/369 |
| 4,926,949 A | | 5/1990 | Forrest |
| 4,976,142 A | | 12/1990 | Perales |
| 5,143,155 A | | 9/1992 | Ferris et al. |
| 5,163,321 A | | 11/1992 | Perales |
| 5,165,235 A | | 11/1992 | Nitschke |
| 5,246,860 A | | 9/1993 | Hutchins et al. |
| 5,515,679 A | | 5/1996 | Shulman |
| 5,554,897 A | * | 9/1996 | Martin et al. .................. 310/54 |
| 5,595,245 A | | 1/1997 | Scott, III |
| 5,723,781 A | | 3/1998 | Pruett et al. |
| 5,890,536 A | | 4/1999 | Nierode et al. |
| 5,931,000 A | | 8/1999 | Turner et al. |
| 5,944,446 A | | 8/1999 | Hocking |
| 6,016,191 A | | 1/2000 | Ramos et al. |
| 6,125,934 A | | 10/2000 | Lenn et al. |
| 6,201,327 B1 | * | 3/2001 | Rivas ................... F04D 13/062 310/87 |
| 6,291,404 B2 | | 9/2001 | House |
| 6,355,995 B1 | * | 3/2002 | Jeppesen ................. H02K 9/12 310/52 |
| 6,543,538 B2 | | 4/2003 | Tolman et al. |
| 6,615,926 B2 | * | 9/2003 | Hester et al. ................. 166/370 |
| 6,622,791 B2 | * | 9/2003 | Kelley .................... E21B 43/38 166/313 |
| 6,659,175 B2 | | 12/2003 | Malone |
| 6,758,271 B1 | | 7/2004 | Smith |
| 7,032,662 B2 | | 4/2006 | Malone et al. |
| 7,207,389 B2 | | 4/2007 | Foster et al. |
| 7,265,079 B2 | | 9/2007 | Willberg et al. |
| 7,296,625 B2 | | 11/2007 | East, Jr. |
| 7,347,260 B2 | | 3/2008 | Ferguson et al. |
| 7,523,024 B2 | | 4/2009 | Endres et al. |
| 7,565,929 B2 | | 7/2009 | Bustos et al. |
| 7,914,266 B2 | * | 3/2011 | Kerr et al. ................. 417/410.1 |
| 2003/0079877 A1 | | 5/2003 | Wellington et al. |
| 2004/0074642 A1 | | 4/2004 | Price-Smith et al. |
| 2005/0091991 A1 | * | 5/2005 | Roldan Villalobos . F25J 1/0007 62/48.3 |
| 2005/0217859 A1 | | 10/2005 | Hartman et al. |
| 2006/0113077 A1 | | 6/2006 | Willberg et al. |
| 2006/0113851 A1 | * | 6/2006 | Ishihara ................. H02K 11/33 310/52 |
| 2006/0124300 A1 | * | 6/2006 | Steiner .................. E21B 21/067 166/267 |
| 2007/0083331 A1 | | 4/2007 | Craig et al. |
| 2007/0223999 A1 | | 9/2007 | Curlett |
| 2007/0272407 A1 | | 11/2007 | Lehman et al. |
| 2008/0026958 A1 | | 1/2008 | Shinbach et al. |
| 2008/0083536 A1 | | 4/2008 | Cavender et al. |
| 2008/0128108 A1 | | 6/2008 | Clark |
| 2008/0210423 A1 | | 9/2008 | Boney |
| 2008/0236823 A1 | | 10/2008 | Willberg et al. |
| 2009/0037112 A1 | | 2/2009 | Soliman et al. |
| 2009/0065253 A1 | | 3/2009 | Suarez-Rivera et al. |
| 2009/0217701 A1 | * | 9/2009 | Minta et al. .................... 62/612 |

FOREIGN PATENT DOCUMENTS

| | | | |
|---|---|---|---|
| EP | 0357317 | A | 3/1990 |
| EP | 0435430 | A1 | 7/1991 |
| EP | 1980604 | A | 10/2008 |
| GB | 2288694 | A | 10/1995 |
| WO | WO 99/05394 | A | 2/1999 |
| WO | WO 2004/076815 | A | 9/2004 |
| WO | WO 2005/001242 | A2 | 1/2005 |
| WO | WO 2006/002325 | A2 | 1/2006 |
| WO | WO 2007040033 | A1 * | 4/2007 |
| WO | WO 2008/064074 | | 5/2008 |
| WO | WO 2008/107831 | A2 | 9/2008 |
| WO | WO 2008/122114 | | 10/2008 |
| WO | WO 2008/156970 | | 12/2008 |

OTHER PUBLICATIONS

WO, PCT/US2009/042421—Search Report, dated Sep. 14, 2009.
WO, PCT/US2010/038420—Search Report, dated Aug. 18, 2010.
WO, PCT/US2010/036969—Search Report, dated Jul. 21, 2010.
WO, PCT/US2009/042138—Search Report, dated Aug. 21, 2009.
WO, PCT/US2009/049844—Search Report, dated Dec. 17, 2009.
WO, PCT/US2009/053304—Search Report, dated Mar. 11, 2009.
WO, PCT/US2010/030013—Search Report, dated Jun. 7, 2010.
WO, PCT/US2009/054536—Search Report, dated Nov. 18, 2009.
Tester et al, The future of thermal energy: Impact of Enhanced Geothermal Systems (EGS) on the United States in the 21$^{st}$ Century; (Retrieved from the Internet, <URL: geothermal.inel.gov/publications/future_or_geothermal_energy.pdf>) 2006, 372 pgs.
Biopolymers: overview of several properties and consequences on their applications: K. Van de Velde and P. Kiekens; Department of Textiles, Ghent University, Sep. 11, pp. 433-442.
Components on High Temperature Plugs: Progress Report on Polymers and Silicates; S. Bauer, D. Galbreath, J. Hamilton and A. Mansure; Geothermal Resources Council Transactions, vol. 28, Aug. 29-Sep. 1, 2004, pp. 145-452.
Greatly Enhanced Detectability of Geothermal Tracers Through Laser-induced Fluorescence, Peter E. Rose, et al. Oct. 30, 2002; 10 pages.
Kinetics of Fluorescein Decay and Its Application As a Geothermal Tracer; Michael Adams and Jon Davis; vol. 20, No. 1/2; pp. 53-66, 1991.

* cited by examiner

US 9,874,077 B2

METHOD AND COOLING SYSTEM FOR ELECTRIC SUBMERSIBLE PUMPS/MOTORS FOR USE IN GEOTHERMAL WELLS

CROSS REFERENCE TO RELATED APPLICATIONS

This application claims priority from U.S. Provisional Application No. 61/049,281, entitled "METHOD AND COOLING SYSTEM FOR ELECTRIC SUBMERSIBLE PUMPS/MOTORS FOR USE IN GEOTHERMAL WELLS," filed on Apr. 30, 2008, which is incorporated by reference in its entirety, for all purposes, herein.

FIELD OF TECHNOLOGY

The present application is directed to systems and methods for cooling electrical submersible pumps.

BACKGROUND

Electrical submersible pumps (ESP) are used in the geothermal, oil and gas and water wells for producing fluids from the subterranean well. Traditionally, subterranean wells are completed in porous formations having naturally high permeability and which contain water, oil, natural gas, heated water, brine and/or steam in relative close proximity to the surface of the earth. Geothermal wells are also completed in low permeability formations that contain little to no geothermal fluid. For these low permeability formations, the permeability of the formation is engineered or enhanced through stimulation methods such as pumping of cold water to generate fractures within the formation. This creates or enhances a geothermal reservoir in the high temperature formation to enable development of an Engineered or Enhanced Geothermal System (EGS). Currently, ESP systems are not suitable for most high temperature applications, especially geothermal applications. ESP systems are susceptible to pump cavitation due to boiling in high temperature wells producing water and/or brine above 100° C. Electrical motors in ESP systems are tested at temperatures of up to 2200° C. at low flow rates while high volume ESPs are designed to withstand temperatures up to 200° C. The temperature of the earth grows hotter with increasing depth, and geothermal systems can have well temperatures ranging from 150° C. to greater than 300° C. Advanced methods for recovering heavy oil may involve the use of steam to mobilize or heat oil and water produced from the reservoir having a temperature above 200° C. ESP systems used to recover oil with hot water in these steam flood wells are exposed to temperatures above design limits of current ESPs.

Line shaft pumps have been used in the petroleum, mine dewatering and geothermal industry for high temperature applications. Line shaft pump arrangements include a pump positioned in the subterranean well at depth calculated to allow for draw down, gas breakout, boiling of the fluid in the well and frictional pressure drop in the well. The pump is driven by a pump motor positioned at the surface which turns the shaft connected to the pump in the well. Line shaft pumps cannot be set at deep depths, because the long line shaft flexes too much causing vibration, stress on the bearings and excessive wear in the pump bowls. Currently, due to these problems, line shaft pumps cannot be set at depths greater than about 2000 ft. Subterranean wells including high temperature and EGS wells require pumps; to be set at depths greater than 2,000 feet. Therefore, line shaft, pumps are not suitable for many high temperature and deep well applications.

The present application is directed to systems and methods for cooling electrical submersible pumps and components thereof.

SUMMARY

Systems and methods for cooling electrical components of an electrical submersible pump in a subterranean well are disclosed. Cooling fluid is delivered from a location proximate ground surface through a conduit to a submerged electrical pump motor in a subterranean well to cool the submerged electrical pump motor.

The foregoing and other objects, features and advantages of the present disclosure will become more readily apparent from the following detailed description and figures of exemplary embodiments as disclosed herein.

BRIEF DESCRIPTION OF THE DRAWINGS

Embodiments of the present application are described; by way of example only, with reference to the attached Figures, wherein.

DETAILED DESCRIPTION

Figure 1:
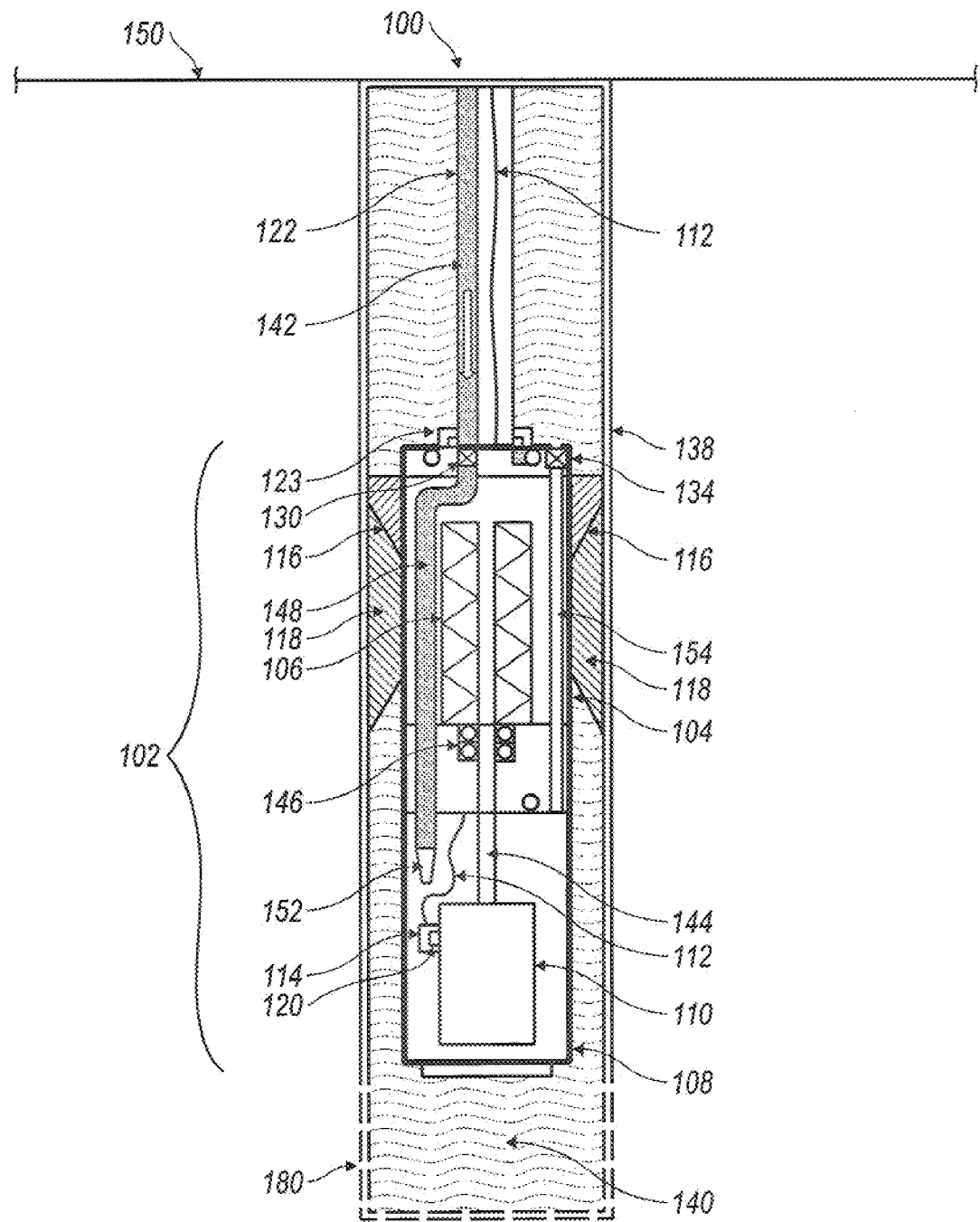
FIG. 1 illustrates an exemplary system for cooling a submerged electrical pump motor in a subterranean well according to one embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein. It will be understood by those of ordinary skill in the art that the systems and methods herein disclosed may be applied to subterranean wells including, but not limited to, geothermal wells, oil wells, gas wells, water wells, injection wells or any other well known in the art for producing or injecting fluids.

FIG. 1 illustrates an exemplary system for cooling a submerged electrical pump motor 110 in a subterranean well 100 according to one embodiment. A pump assembly 102 including a pump housing 104, a pump 106, a motor housing 108, an electrical pump motor 110 a shaft 144, a bearing 146 and an electrical cable 112 is disposed within the subterranean well 100. The bearing 146 facilitates the transmission of rotational power from the electrical pump motor 110 through the shaft 144 and to the pump 106. The electrical cable 112 includes an electrical cable head connector 114 that is connected to an electrical motor lead 120 for powering the motor 110. The pump housing 104 may include profile nipples 116 for securing the pump assembly 102 on top of polished bore receptacles 118 within the well casing 138. When seated on top of the polished bore receptacles 118, the profile nipples 116 form a seal between the pump housing 104 and the polished bore receptacle 118 installed in the well casing 138. It is also contemplated that the pump assembly 102 may be secured within the well 100 or well casing 138 in other ways known in the art including, but not limited to, suspending the pump assembly 102 in the well 100 with tubing.

Downhole fluids produced through the production interval 180 and from the subterranean well 100 may be heated within the subterranean formation. Some subterranean wells 100 and fluids therein may be heated to temperatures greater than 200° C. Electrical components of the pump assembly 102 including the electrical pump motor 110, the electrical cable 112, the electrical cable head connector 114 and the electrical motor lead 120 are susceptible to thermal failure at temperatures greater than 200° C. Cooling fluid is delivered through a cooling conduit 122 such as coil tubing, capillary tubing or threaded jointed tubing from a location proximate ground surface 150 to the motor housing 108 to cool the submerged electrical pump motor 110 and electrical components thereof including, but not limited to, the electrical cable 112, the electrical cable head connector 114 and the electrical motor lead 120. A compression fitting 123 may be provided at the top of the pump assembly 102 to attach the cooling conduit 122 to a pump by-pass conduit 148 and to prevent downhole fluids from entering the motor housing 108, the cooling conduit 122, the pump by-pass conduit 148 and the expansion nozzle 152.

The electrical cable 112 for powering the submerged electrical pump motor 110 may be disposed within a cooling conduit 122 such as coil tubing or threaded jointed tubing to prevent exposure to downhole fluids and protect the electrical cable 112 from high temperatures within the subterranean well 100. A data communication line (not shown) for communicating data to the surface 150 may also be disposed within a cooling conduit 122 such as coil tubing or threaded jointed tubing to prevent exposure to downhole fluids and protect the data communication line from high temperatures within the subterranean well 100.

Cooling fluid including, but not limited to, nitrogen, refrigerant or other inert gases may be conveyed downhole through the cooling conduit 122 in an annulus 142 between the inside wall of cooling conduit 122 and the electrical cable 112. Nitrogen is a preferred cooling fluid, because it is nonflammable, noncorrosive and inert. Nitrogen may be conveyed downhole through the annulus 142 of the cooling conduit 122 in the liquid phase or the gas phase. In one embodiment, nitrogen is conveyed downhole in the liquid phase through the annulus 142 of the cooling conduit 122 to cool electrical components including the electrical cable 112 within the cooling conduit 122. Nitrogen enters a pump by-pass conduit 148 through a one way inlet check valve 130. Nitrogen is circulated into the motor housing 108 and into the electrical pump motor 110 through the pump by-pass conduit 148 including an expansion nozzle 152 for expanding the nitrogen in the motor housing 108. The expansion of nitrogen through the expansion nozzle 152 converts the nitrogen from the liquid phase to the gas phase in the motor housing 108 to cool the submerged electrical motor 110, the electrical cable 112, the electrical cable head connector 114 and the electrical motor lead 120. Nitrogen has a latent heat of vaporization of 2399 BTU/lb mole and therefore has the ability to absorb large quantities of heat as it is converted from the liquid phase to the gas phase. Gaseous thermal energy laden nitrogen exits the motor housing 108 through an outlet-conduit 154 and a one way outlet check valve 134 to enter a fluid column 140 in the well casing 138.

The one way inlet check valve 130 and the one way outlet check valve 134 permit the unidirectional flow of nitrogen. The valves 130, 134 also close to prevent downhole fluids such as water, geothermal brine, oil or gas from entering the pump housing 104, the cooling conduit 122, the pump by-pass conduit148 the motor housing 108 and the outlet conduit 154 when the pressure across the valves 130, 134 drops below a predetermined threshold. The one way inlet check valve 130 and the one way outlet check valve 134 may be a swing check valve, piston lift check valve, ball-type check valve, stop check valve, duo check valve or any other valve capable of permitting unidirectional fluid flow therethrough. When pressure across the one way inlet check valve 130 reaches a predetermined limit, the valve 130 opens permitting liquid nitrogen to enter the pump by-pass conduit 148 and flow into the motor housing 108. The flow of nitrogen through the one way inlet check valve 130, down the pump by-pass conduit 148 and into the motor housing 108 is facilitated by the hydrostatic pressure created by the liquid nitrogen. If the pressure in the motor housing 108 is maintained at a lower pressure than the vapor pressure created by the liquid nitrogen, then the liquid nitrogen will flow through the one way inlet check valve 130, down the pump by-pass conduit 149 and a into the motor-housing 108. The pressure in the motor housing 108 may be controlled by allowing the cooling fluid to vent to a lower pressure through the one way outlet check valve 134. The motor housing 108 is maintained at a higher pressure than the venting pressure. When pressure across the one way outlet check valve 134 reaches a predetermined limit, the valve 134 opens permitting gaseous thermal energy laden nitrogen to exit the motor housing 108, flow through the outlet conduit 154 and enter the fluid column 140 within the casing 138. The pressure within the motor housing 108 is maintained at a higher pressure than the pressure above the one way outlet check valve 134 to facilitate the flow of gaseous thermal energy laden nitrogen up the outlet conduit 154, through the one way outlet check valve 134 and into the fluid column 140.

In an exemplary embodiment, the pressure above the one way outlet check valve 134 may be maintained at less than 492 psia to facilitate flow of gaseous thermal energy laden nitrogen out of the motor housing 108, up the outlet conduit 154 through the one way outlet check valve 134, and into the fluid column 140. The fluid column 140 may contain downhole fluids including, but not limited to, drilling fluids, injected fluids or production fluids such as oil, gas, water and/or geothermal brine. The fluid column 140 is lifted to the surface 150 by the pump 106 which is driven by the submerged electrical motor 110. The gaseous thermal energy laden nitrogen becomes entrained in downhole fluid within the fluid column 140 and reduces the density of the fluid column 140. The reduction in density provides a gas-lift assist affect that drives the fluid column 140 to the surface 150. Therefore, the horsepower required to pump the fluid column 140 to the surface 150 is reduced by the gas-lift assist affect created by the entrained gaseous nitrogen.

Figure 2:
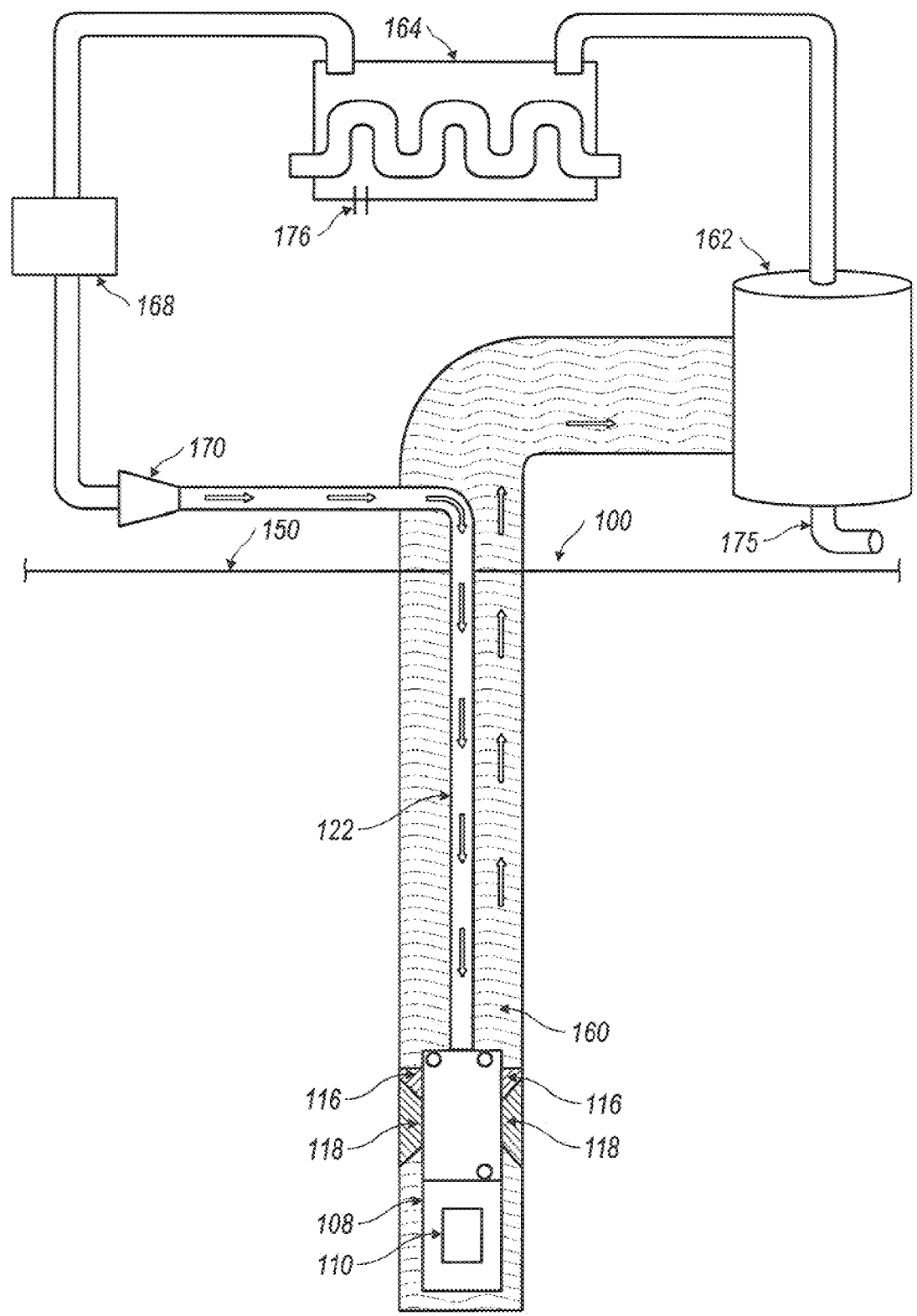
FIG. 2 illustrates an exemplary system for re-circulating cooling fluid to a submerged electrical pump motor in a subterranean well according to one embodiment.

FIG. 2 illustrates an exemplary system for re-circulating cooling fluid to a submerged electrical pump motor 110 in a subterranean well 100 according to one embodiment. At the surface 150, entrained gaseous nitrogen is removed from a stream of downhole fluid 160 in a high pressure separator 162 at a pressure below the partial pressure of the gaseous nitrogen but very close to the saturation pressure of the fluid 160 exiting the top of the subterranean well 100. Under these operating conditions, the high pressure separator 162 removes most of the entrained gaseous nitrogen from the stream of downhole fluid 160.

In an exemplary embodiment, the stream of downhole fluid 160 is water, and substantially all the entrained gaseous nitrogen is separated from the water in the high pressure separator 162 with only a small amount of steam exiting with the gaseous nitrogen from the high pressure separator 162. Separated water exits the bottom 175 of the high pressure separator 162. The steam and gaseous nitrogen may be flowed through a condenser 164 wherein the small amount of steam is condensed to water and flowed through a water outlet 176. The water may be used as make-up water in a cooling cycle of a geothermal plant, injected into an injection well or disposed of with other waste water from the subterranean well 100. The gaseous nitrogen is pumped out of the condenser 164 with a vacuum pump 168 and compressed into liquid in a compressor 170. The compressed liquid nitrogen is re-circulated downhole through the cooling conduit 122 and into the motor housing 108 to cool the submerged electrical pump motor 110 and electrical components thereof. Additional nitrogen or other inert gas may be added to the system to replace the gaseous nitrogen that remains entrained in the water from stream of downhole fluid 160.

Figure 3:
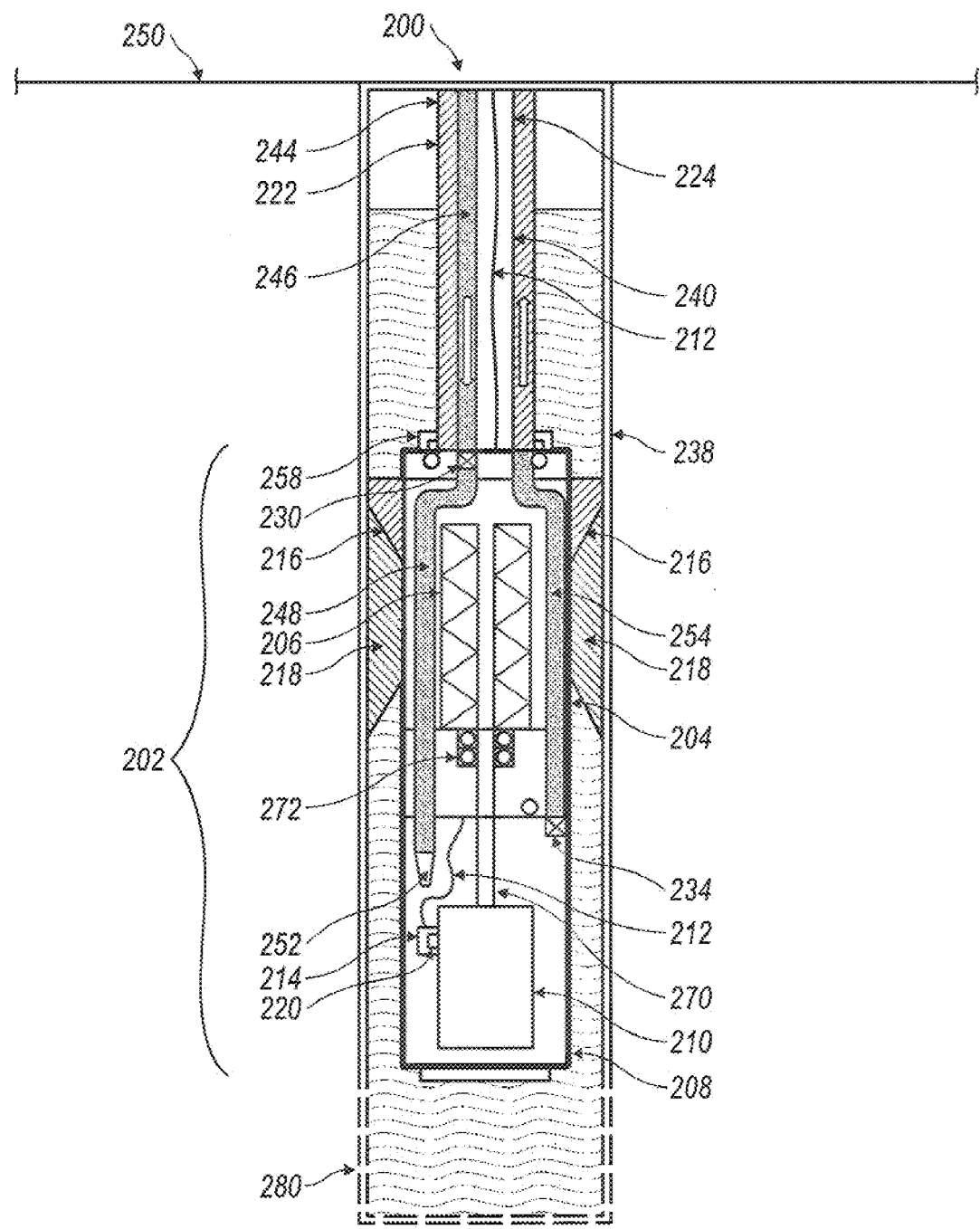
FIG. 3 illustrates an exemplary system for cooling a submerged electrical pump motor in a subterranean well according to another embodiment.

FIG. 3 illustrates an exemplary system for cooling a submerged electrical pump motor 210 in a subterranean well 200 according to another embodiment. A pump assembly 202 including a pump housing 204, a pump 206, a motor housing 208, an electrical pump motor 210 a shaft 270, a bearing 272 and an electrical cable 212 is disposed within the subterranean well 200. The bearing 272 facilitates the transmission of rotational power from the electrical pump motor 210 through the shaft 270 and to the pump 206. The electrical cable 212 includes an electrical cable head connector 214 that is connected to an electrical motor lead 220 for powering the motor 210. The pump housing 204 may include profile nipples 216 for securing the pump assembly 202 on top of polished bore receptacles 218 installed within the well casing 238. When seated on top of the polished bore receptacles 218, the profile nipples 216 form a seal between the pump housing 204 and the polished bore receptacles 218. It is also contemplated that the pump assembly 202 may be secured within the well 200 or well casing 238 in other ways known in the art including, but not limited to, suspending the pump assembly 202 in the well 200 with tubing.

Downhole fluids produced through the production interval 280 and from the subterranean well 100 may be heated within the subterranean formation. Some subterranean wells 100 and fluids therein may be heated to temperatures greater than 200° C. Electrical components of the pump assembly 202 including the electrical pump motor 210, the electrical cable 212, the electrical cable head connector 214 and the electrical motor lead 220 are susceptible to thermal failure at temperatures greater than 200° C. Cooling fluid is delivered through a conduit such as concentric coil tubing 222 from a location proximate ground surface 250 to the motor housing 208 to cool the submerged electrical pump motor 210 and electrical components thereof including, but not limited to, the electrical cable 212, the electrical cable head connector 214 and the electrical motor lead 220.

The concentric coil tubing 222 may include an outer tubing string 244 and an inner tubing string 224. A compression fitting 258 may be provided at the top of the pump assembly 202 to attach the concentric coil tubing 222 to the pump by-pass conduit 248 and to prevent downhole fluids from entering the motor housing 208, the cooling conduit 222, the pump by-pass conduit 248 and the expansion nozzle 252. The electrical cable 212 for powering the submerged electrical pump motor 210 may be disposed within the inner tubing string 224 to prevent exposure to downhole fluids and protect the electrical cable 212 from high temperatures within the subterranean well 200. A data communication line (not shown) for communicating data to the surface 250 may also be disposed within the inner tubing string 224 to prevent exposure to downhole fluids and protect the data communication line from high temperatures within the subterranean well 200.

Cooling fluid including, but not limited to, nitrogen, refrigerant or other inert gases may be conveyed downhole through the inner tubing string 224 in an annulus 246 between the inside wall of the inner tubing string 224 and the electrical cable 212. Nitrogen is a preferred cooling fluid, because it is nonflammable, noncorrosive and inert. Nitrogen may be conveyed downhole through the annulus 246 in the liquid phase or gas phase. In one embodiment, nitrogen is conveyed downhole in the liquid phase through the annulus 246 of the inner tubing string 224 to cool electrical components including the electrical cable 212 within the inner tubing string 224. Nitrogen enters a pump by-pass conduit 248 through a one way inlet check valve 230. Nitrogen is circulated into the motor housing 208 and into the electrical pump motor 210 through the pump by-pass conduit 248 including, an expansion nozzle 252 for expanding the nitrogen in the motor housing 208. The expansion of nitrogen through the expansion nozzle 252 converts the nitrogen from the liquid phase to the gas phase in the motor housing 208 to cool the submerged electrical motor 210, the electrical cable 212, the electrical cable head connector 214 and the electrical motor lead 220. Nitrogen has a latent heat of vaporization of 2399 BTU/lb mole and therefore has the ability to absorb large quantities of heat as it is converted from the liquid phase to the gas phase. Gaseous thermal energy laden nitrogen exits the motor housing 208 through a one way outlet check valve 234 and into an outlet conduit 254 which is connected in fluid communication with the outer tubing string 244 of the concentric coil tubing 222.

The one way inlet check valve 230 and the one way outlet check valve 234 permit the unidirectional flow of nitrogen. The valves 230, 234 also close to prevent downhole fluids such as water, geothermal brine, oil or gas from entering the pump housing 204, the concentric coil tubing 222, pump by-pass conduit 248 and the motor housing 208 when the pressure across the valves 230, 234 drops below a predetermined threshold. The one way inlet check valve 230 and the one way outlet check valve 234 may be a swing check valve, piston lift check valve, ball-type check valve, stop check valve, duo check valve or any other valve capable of permitting unidirectional fluid flow therethrough. When pressure across the one way inlet check valve 230 reaches a predetermined limit, the valve 230 opens permitting liquid nitrogen to enter the pump by-pass conduit 248 and flow into the motor housing 208. The flow of nitrogen through the one way inlet check valve 230, down the pump by-pass conduit 248 and into the motor housing 208 is facilitated by the hydrostatic pressure created by the liquid nitrogen. If the pressure in the motor housing 208 is maintained at a lower pressure than the vapor pressure created by the liquid nitrogen, then the liquid nitrogen will flow through the one way inlet check valve 230, down the pump by-pass conduit 248 and into the motor housing 208. The pressure in the motor housing 208 may be controlled by allowing the cooling fluid to vent to a lower pressure through the one way outlet check valve 234. The motor housing 208 is maintained at a higher pressure than the venting pressure. When pressure across the one way outlet check valve 234 reaches a predetermined limit, the valve 234 opens permitting gaseous thermal energy laden nitrogen to exit the motor housing 208 and flow through the outlet conduit 254 which is connected in fluid communication with the outer tubing string 244 of the concentric coil tubing 222. The pressure within the motor housing 208 is maintained at a higher pressure than the pressure above the one way outlet check valve 234 to facilitate the flow of gaseous thermal energy laden nitrogen up the through the one way outlet check valve 234, up the outlet conduit 254 and into the outer tubing string 244.

The pressure created by gaseous thermal-energy laden nitrogen within the motor housing 208 is maintained at a higher pressure than the pressure within the outlet conduit 254 in order for the gaseous thermal energy laden nitrogen to exit through the one way outlet check valve 234 and flow up the outlet conduit 254. The outlet conduit 254 may be open to a lower pressure collection tank or connected directly to a low pressure condenser to facilitate the flow of gaseous thermal energy laden nitrogen through the one way outlet check valve 234 and up the outlet conduit 254. In an exemplary embodiment, the pressure in the outlet conduit 254 and above the one way outlet check valve 234 may be maintained at less than 492 psia to facilitate flow of gaseous thermal energy laden nitrogen out of the pump housing 208, through the one way outlet check valve 234, up the outlet conduit 254 and into the outer tubing string 244 of the concentric coil tubing 222. The gaseous thermal energy laden nitrogen flows up to the surface 250 in the annulus 240 between the outside wall of the inner tubing string 224 and the inside wall of the outer tubing string 244. The flow of gaseous nitrogen through the outlet conduit 254 and the outer tubing string 244 is further enabled by maintaining a lower downstream pressure within the outer tubing string 244. The gaseous thermal energy laden nitrogen may be liquefied and compressed at the surface 250. The compressed liquid nitrogen is re-circulated downhole through the inner tubing string 224 and expanded in the motor housing 208 to cool the submerged electrical pump motor 210, the electrical cable 212, the electrical cable head connector 214 and the electrical motor lead 220.

Example embodiments have been described hereinabove regarding improved methods and systems for protecting a subterranean enclosure from over-pressure due to thermal expansion. Various modifications to and departures from the disclosed example embodiments will occur to those having skill in the art. The subject matter that is intended to be within the spirit of this disclosure is set forth in the following claims.

What is claimed is:

1. A method comprising:
    delivering liquid nitrogen from a location proximate ground surface to a submerged electrical pump motor operating in a subterranean well;
    converting the liquid nitrogen to nitrogen gas in an expansion volume defined at least partially by a pressure-controlled motor housing, the pressure-controlled motor housing containing the submerged electrical pump motor in the expansion volume;
    cooling the submerged electrical pump motor in the pressure-controlled motor housing using the nitrogen gas,
    venting the nitrogen gas out of the pressure-controlled motor housing; and
    controlling a pressure of the pressure-controlled motor housing, wherein the pressure is between a vapor pressure of the liquid nitrogen and a venting pressure of the nitrogen gas.

2. The method as recited in claim 1, wherein the subterranean well has a temperature of at least 200 degrees Celsius.

3. The method as recited in claim 1, wherein delivering the liquid nitrogen comprises flowing the liquid nitrogen downhole through a cooling conduit extending from the location proximate ground surface to the submerged electrical pump motor.

4. The method as recited in claim 3, wherein the cooling conduit with which the liquid nitrogen is conveyed downhole is a coil tubing or a concentric coil tubing.

5. The method as recited in claim 3, further comprising flowing the liquid nitrogen through a one way inlet check valve and into a pump by-pass conduit and expanding the liquid nitrogen via an expansion nozzle located within the pressure-controlled motor housing.

6. The method as recited in claim 3, wherein venting the nitrogen gas out of the pressure-controlled motor housing comprises flowing the nitrogen gas through a one way outlet check valve when pressure across the one way outlet check valve reaches a predetermined limit and into an outlet conduit connected in fluid communication with the cooling conduit.

7. The method as recited in claim 1, wherein venting the nitrogen gas out of the pressure-controlled motor housing comprises flowing the nitrogen gas through an outlet conduit and into a fluid column lifted by a pump driven by the submerged electrical pump motor, wherein the fluid column comprises a downhole fluid.

8. The method as recited in claim 7, further comprising providing a one way outlet check valve between the outlet conduit and the fluid column for venting the nitrogen gas the one way outlet check valve when pressure across the one way outlet check valve reaches a predetermined limit.

9. The method as recited in claim 8, further comprising providing a gas-lift assist affect to the fluid column within which the nitrogen gas becomes entrained.

10. The method as recited in claim 9, further comprising:
    lifting the fluid column to the surface; and
    separating entrained nitrogen gas from the downhole fluid at the location proximate ground surface.

11. The method as recited in claim 10, further comprising compressing the nitrogen gas with a compressor to form liquid nitrogen.

12. The method as recited in claim 4, wherein an electrical cable for powering the submerged electrical pump motor is disposed within the cooling conduit and liquid nitrogen is conveyed downhole through an annulus of the cooling conduit.

13. The method as recited in claim 1, wherein a location of a coolant outlet is positioned within a perimeter of the pump housing.

14. The method as recited in claim 1, wherein a check valve is adapted to actuate for controlling nitrogen gas flow therethrough at a predetermined venting pressure.

15. The method as recited in claim 1, wherein a pump driven by the submerged electrical pump motor is positioned above the submerged electrical pump motor in the downhole well.

* * * * *